United States Patent [19]

Metz

[11] Patent Number: 5,706,639
[45] Date of Patent: Jan. 13, 1998

[54] BELT MOWER

[76] Inventor: Donald Metz, 6311 Fly Rd., Suite A, East Syracuse, N.Y. 13057

[21] Appl. No.: 602,353

[22] Filed: Feb. 16, 1996

Related U.S. Application Data

[63] Continuation-in-part of Ser. No. 393,489, Feb. 24, 1995, Pat. No. 5,557,913.

[51] Int. Cl.⁶ ........................................ A01D 34/83
[52] U.S. Cl. ........................ 56/244; 56/12.4; 56/291; 56/DIG. 10
[58] Field of Search ...................... 56/244, 12.4, 291, 56/11.6, 290, 292, DIG. 3, DIG. 10

[56] References Cited

U.S. PATENT DOCUMENTS

| | | | |
|---|---|---|---|
| 3,093,170 | 6/1963 | Thayer | 56/290 |
| 3,397,524 | 8/1968 | Hofer | 56/290 |
| 4,030,276 | 6/1977 | Stecklein | 56/291 |
| 5,398,490 | 3/1995 | Allen | 56/244 |

*Primary Examiner*—Terry Lee Melius
*Attorney, Agent, or Firm*—Sughrue, Mion, Zinn, Macpeak & Seas, PLLC

[57] ABSTRACT

A lawn mower includes an elongated forwardly open housing having an endless belt entrained therein about a pair of pulleys mounted at opposite ends of the housing. A plurality of C-shaped, channel-like cutting elements are mounted transversely on the outer surface of the belt to cut the lawn as the housing is moved across the lawn on a plurality of rollers. The housing is divided into a plurality of sections which are pivotally interconnected so that the housing sections may pivot relative to each other due to uneven ground. Guide members are provided within the housing to maintain the opposed reaches of the belt parallel to each other during such pivoting of the sections. The cutting elements may also be a plurality of wires embedded in the belt and extending outward from one side of the belt in the plane of the belt.

10 Claims, 13 Drawing Sheets

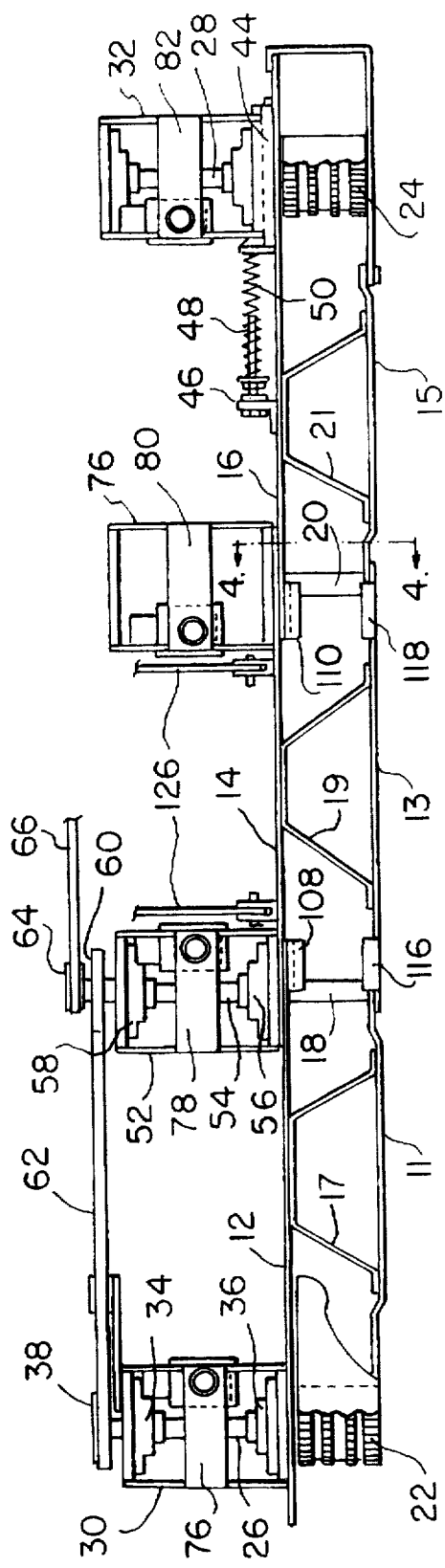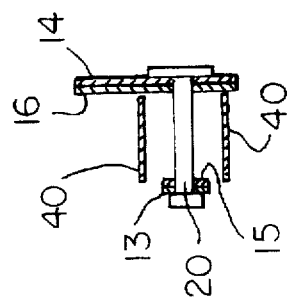
FIG. 3
FIG. 4

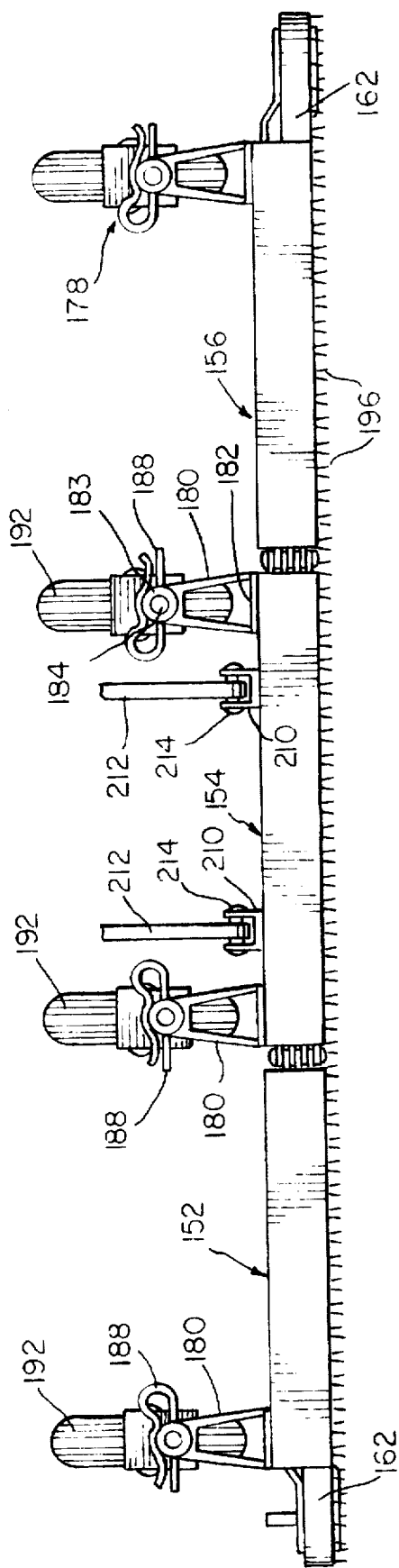

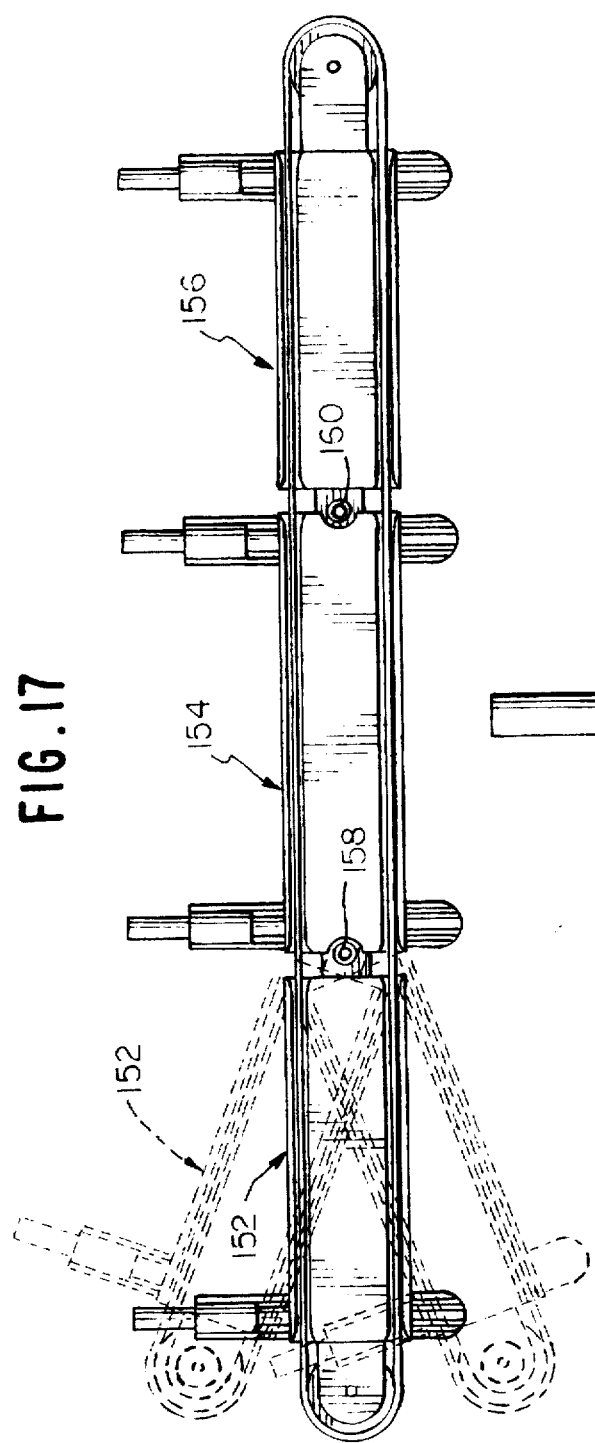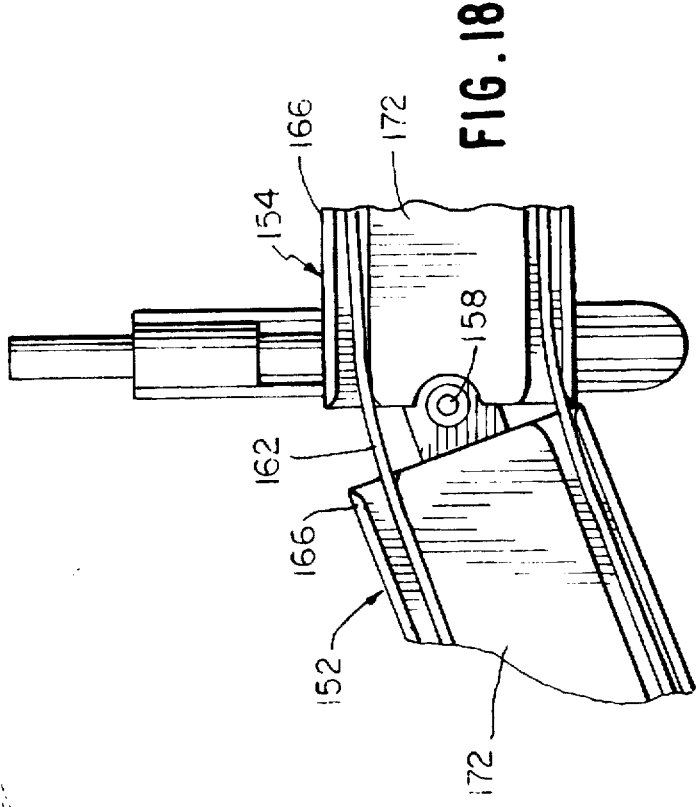

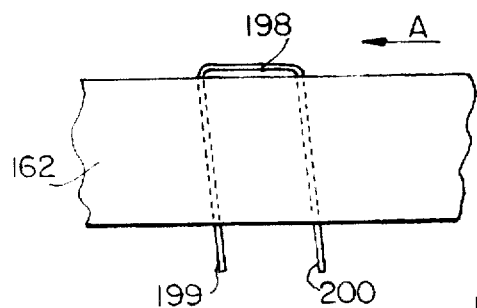
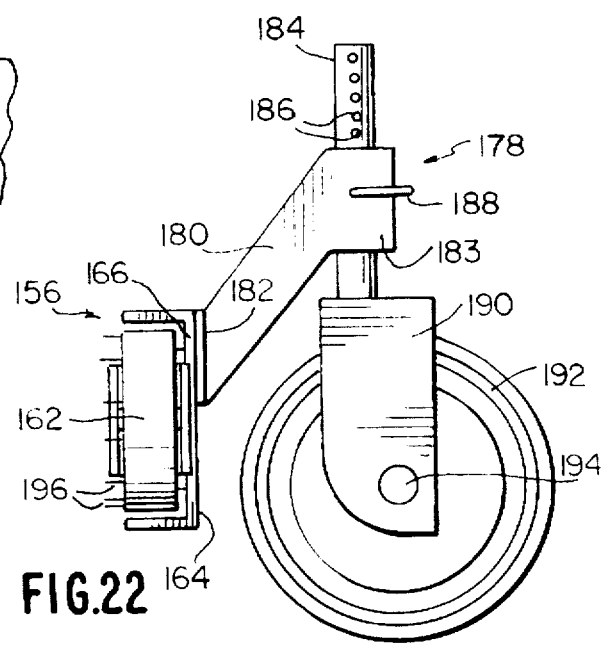
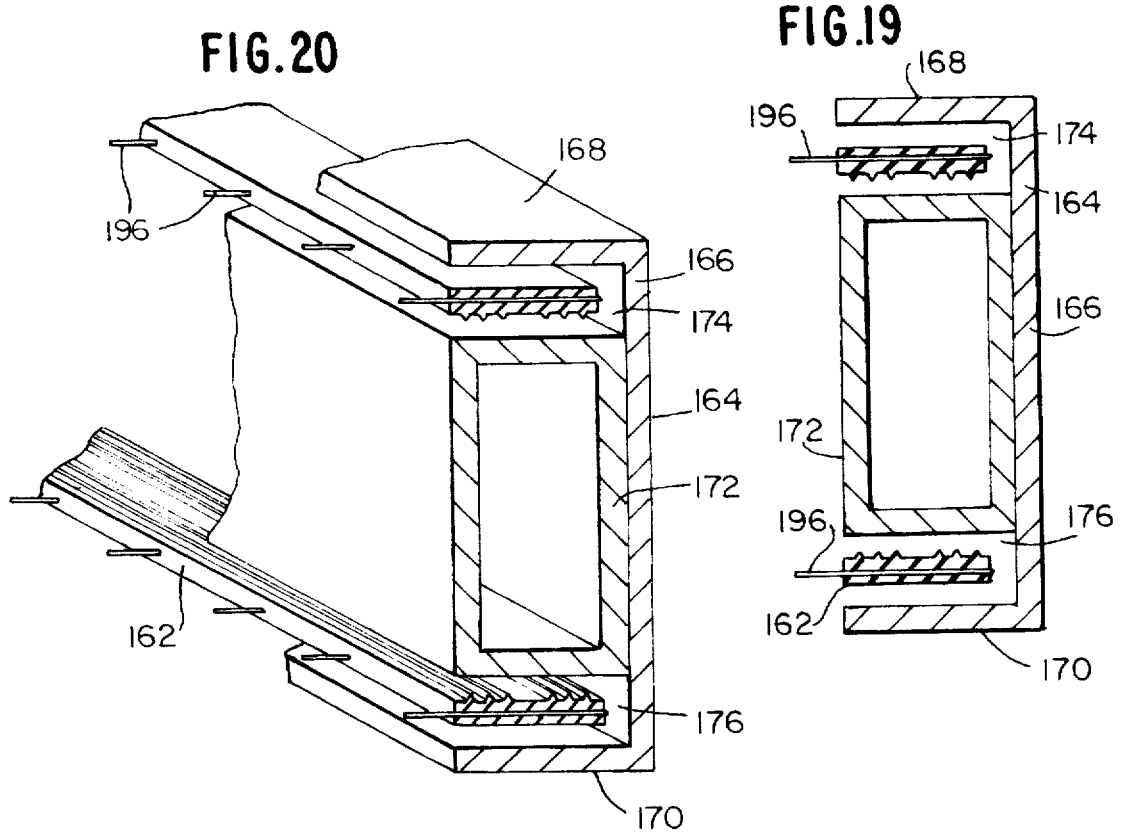

BELT MOWER

This is a Continuation-in-Part of application Ser. No. 08/393,489 filed Feb. 24, 1995, now U.S. Pat. No. 5,557, 913.

BACKGROUND OF THE INVENTION

The present invention is directed to a belt mower and more specifically to an articulated belt mower adapted to be powered by a tractor or a walk behind unit wherein a plurality of cutting elements are mounted in spaced relation on an endless belt travelling in a plane perpendicular to the movement of the power unit.

For many years, the most common type of mower was the well known reel type mower comprised of a plurality of spiral blades mounted for rotation about a common axis which cooperated with a fixed straight blade extending parallel to the axis. The reel type mower provided a very good straight line cut but could not cut all types of grasses or weeds and needed continual adjustment and sharpening.

With the advent of power driven mowers, the rotary mower became popular. However, the rotary mower cuts in one or more circular patterns resulting in the twisting of the grass thereby causing split tops and different patterns of cut for an uneven look. Furthermore, even by using a plurality of rotary blades, the cutting width of the deck was limited since the deck was inflexible and was not able to contour to uneven terrain. This created a limitation of the types of cutting which could be done with a rotary mower. Conventional rotary mowers also required substantial horse power due to the use of large heavy steel blades.

Although endless belt-type mowers never became popular, several patents were granted on this type of mower. The U.S. patent to Hackerott (U.S. Pat. No. 2,514,861) is directed to a power lawn mower having an endless belt and a plurality of cutter blades secured thereto. The cutter blades extend perpendicular from the planar service of the belt with the belt operating in a horizontal plane. A similar type mower is disclosed in the U.S. patent to Miner (U.S. Pat. No. 2,744,376).

The U.S. patent to Fralish (U.S. Pat. No. 4,418,519) discloses an endless belt-type lawn mower wherein the endless belts are placed is a substantially horizontal plane. Fralish utilizes two parallel belts having pivot pins connected therebetween upon which a plurality of plastic whip sticks are mounted for cutting the grass.

The U.S. patent to Matthews (U.S. Pat. No. 3,488,931) discloses a mowing machine having an endless chain disposed for operation in a substantially vertical plane. The cutting blades extend forwardly of the chain in the plane of the chain.

The U.S. patents to Hurlburt (U.S. Pat. No. 3,722,195), Johnson (U.S. Pat. No. 2,948,099) and Templeton (U.S. Pat. No. 2,543,386) are all directed to harvesting machines having a cutter bar or a cutter head with an endless belt or chain entrained about the cutter bar or head for rotation in a substantially horizontal plane. The blade members protrude outwardly in the plane of the rotating chain or belt.

The patent to Heath (U.S. Pat. No. 4,267,686) discloses a lawn mower having flexible filament cutter elements made from any suitable elastomeric or plastic material. The flexible filaments may be molded integral with a carrier belt if the same material is used. The belt travels in a horizontal plane and the flexible filament cutter elements are moved outwardly by centrifugal force for cutting engagement with grass or other vegetation.

The patent to Marsh et al. (U.S. Pat. No. 3,831,358) also discloses the use of a plurality of bristles or tines of nylon or metal which may be encased or imbedded in a slab of elastomeric material which is secured on the outer surface of a belt disposed for movement in a horizontal plane.

The patent to Howerton et al. (U.S. Pat. No. 4,185,447) discloses a hay conveying belt and hay rake. The belt is mounted for operation in a horizontal plane and has a plurality of tines or teeth extending in the plane of the belt perpendicular to the ground for engaging and carrying hay toward the center of the rake upon which the belt is mounted for rotation.

SUMMARY OF THE INVENTION

The present invention is directed to a new and improved mower utilizing an endless flexible belt having a plurality of cutting elements mounted thereon wherein the belt is mounted about a plurality of pulleys and an articulated housing which readily conforms to variations in the terrain.

The present invention provides a new and improved mower which will provide a more uniform cut with no scalping and which only requires reduced horse power as compared with a rotary mower. As a result, the belt mower is very efficient and produces very little noise. The belt mower may readily be mounted underneath or in front of a tractor or can be powered by a walk behind unit giving good maneuverability while having a wide cutting width.

The present invention provides a new and improved mower wherein the cutting elements are mounted on a belt which is entrained about a plurality of pulleys for movement in a vertical plane. According to a first embodiment, the cutting elements are comprised of a plurality of blades mounted on the outer surface of the belt with each blade having a curved configuration to produce good air flow for maximum grass lift, discharge and mulching capability. According to a second embodiment of the invention, the cutting elements are comprised of a plurality of wires embedded in the belt and extending outwardly from one side of the belt in the plane of the flat belt. The wires extend at an oblique angle relative to the direction of movement.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 3 is a top plan view of the mower.

FIG. 4 is a sectional view taken along the line 4—4 in FIG. 3.

FIG. 16 is a top plan view of the mower according to the second embodiment of the present invention.

FIG. 17 is a front elevational view of the mower according to the second embodiment of the present invention showing the range of movement of a pivoted section of the mower.

FIG. 18 is a detailed view of the pivotal connection shown in FIG. 17.

FIG. 19 is a sectional view taken along the line 19—19 in FIG. 13.

FIG. 20 is a perspective view of the components shown in FIG. 19.

FIG. 21 is an enlarged detail of a portion of the belt showing the manner in which the filaments are imbedded in the belt.

FIG. 22 an end elevational view of the mower as viewed from the right side of FIG. 13.

DETAILED DESCRIPTION OF THE INVENTION

Figure 1:
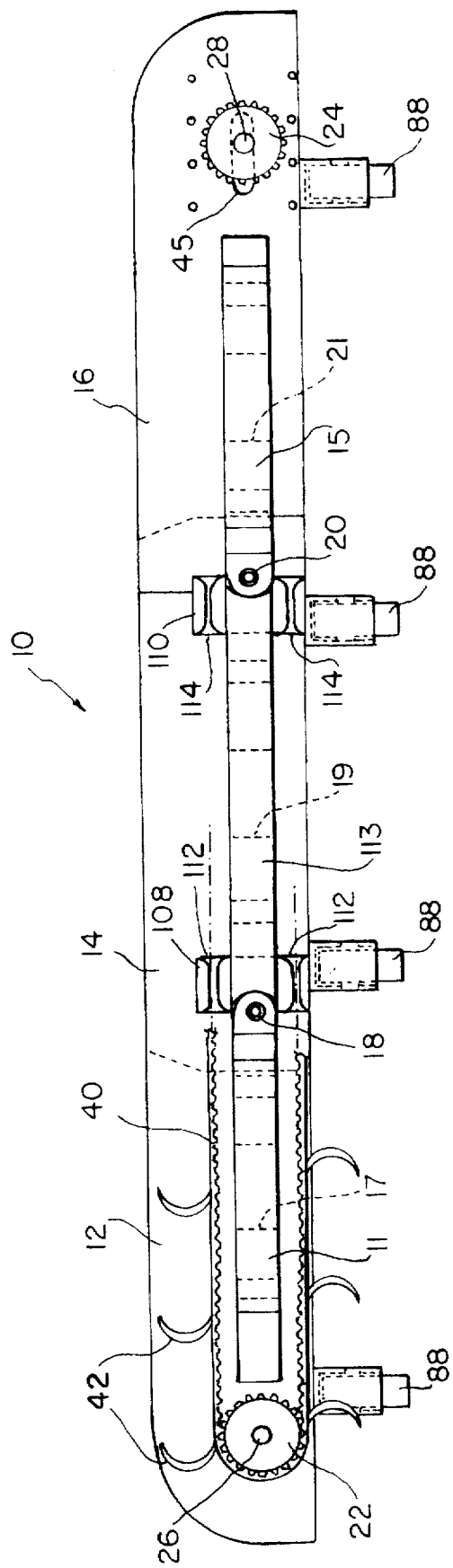
FIG. 1 is a front elevational view of the mower according to a first embodiment of the present invention with the front and top guard plates removed.

The belt mower 10 according to a first embodiment of the invention is shown in FIG. 1 and is comprised of an elongated housing open at the bottom and having an endless belt entrained about a pair of pulleys in the housing with a plurality of spaced apart transversely extending curved blades mounted on the belt for cutting grass in a direction transverse to the movement of the mower which would be perpendicular to the paper as viewed in FIG. 1.

In FIG. 1 however, the top and front shrouds have been removed to more clearly illustrate the arrangement of the belt and blades within the housing.

The mower is comprised of three rear support plates 12, 14 and 16 which are pivotally connected by means of pivot pins 18 and 20.

Three front support plates 11, 13 and 15 of narrower width than the rear support plates are connected to the rear support plates 12, 14 and 16, respectively, by brackets 17, 19 and 21, respectively by welding or any other suitable arrangement depending on the materials used. The front plates are pivotally connected by the same pins 18 and 20 which pivotally connect the rear plates.

A drive pulley 22 and a driven pulley 24 are rotatably mounted by means of shafts 26 and 28, respectively which extend through the support plates 12 and 16, respectively and are supported for rotation in bearing assemblies 30 and 32, respectively. An endless belt 40 is entrained about the pulleys 22 and 24 and a plurality of cutting blades 42 are secured in spaced apart relation on the outer surface of the belt 40.

Figure 2:
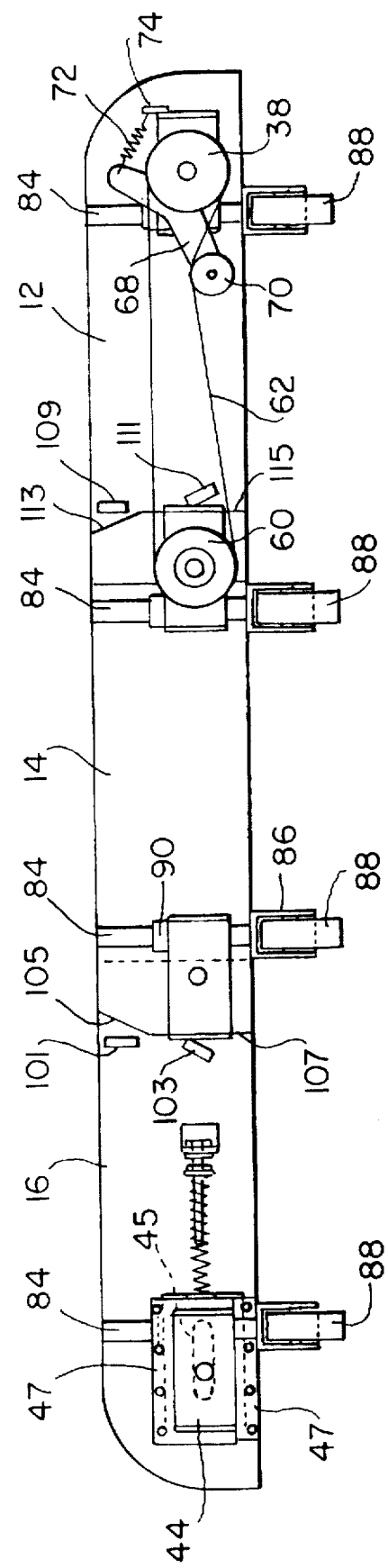
FIG. 2 is a rear elevational view of the mower.

The bearing assembly 30 is fixedly secured to the rear surface of the support plate 12 and the shaft 26 is rotatably supported in bearings 34 and 36 within the bearing assembly 30. The end of the shaft 26, opposite the end carrying the pulley 22, carries a pulley 38. The bearing assembly 32 is substantially identical to the bearing assembly 30 but is mounted on a plate 44 which is slidably mounted on the rear surface of the support plate 16 by means of a pair of gibbs 47 as shown in FIGS. 2 and 3. Thus the bearing assembly 32 and the shaft 28 upon which the pulley 24 is mounted, are movable as a unit in order to tension the endless belt. The shaft 28 extends through an elongated slot 45 in the support plate 16 since the pulley 24 can shift as much as 2⅛ upon pivotal movement of the support plates 12 and 16 relative to support plate 14. An abutment 46 is mounted on the rear surface of the support plate 16 and carries a guide bolt 48. A spring 50 is mounted on the guide bolt 48 and extends between the abutment 46 and the slidable plate 44 for normally biasing the bearing assembly 32 toward the end of the housing for tensioning the belt at all times during relative pivotal movement of the support plates.

A third bearing assembly 52 is fixedly mounted on the rear surface of the support plate 14. A shaft 54 is rotatably mounted by means of bearings 56 and 58. The shaft 54 is in axial alignment with the pivot pin 18 and one end of the shaft 54 extends rearwardly of the bearing assembly 52 and carries a pulley 60. A drive belt 62 is entrained about the pulley 60 and pulley 38. A smaller pulley 64 is also mounted on the end of the shaft 54 and carries a drive belt 66 which may be connected to a suitable power source. A belt tensioner is provided for the belt 62 in the form of a lever 68 pivotally mounted on the end of the bearing assembly 30. A roller or pulley 70 is rotatably mounted on one end of the lever and maintained in engagement with the outer surface of the belt 62. A spring 72 is connected between the opposite end of the lever 68 and a fixed abutment 74 on the bearing assembly for normally biasing the roller 70 into tensioning engagement with the belt 62.

Figures 7, 8:
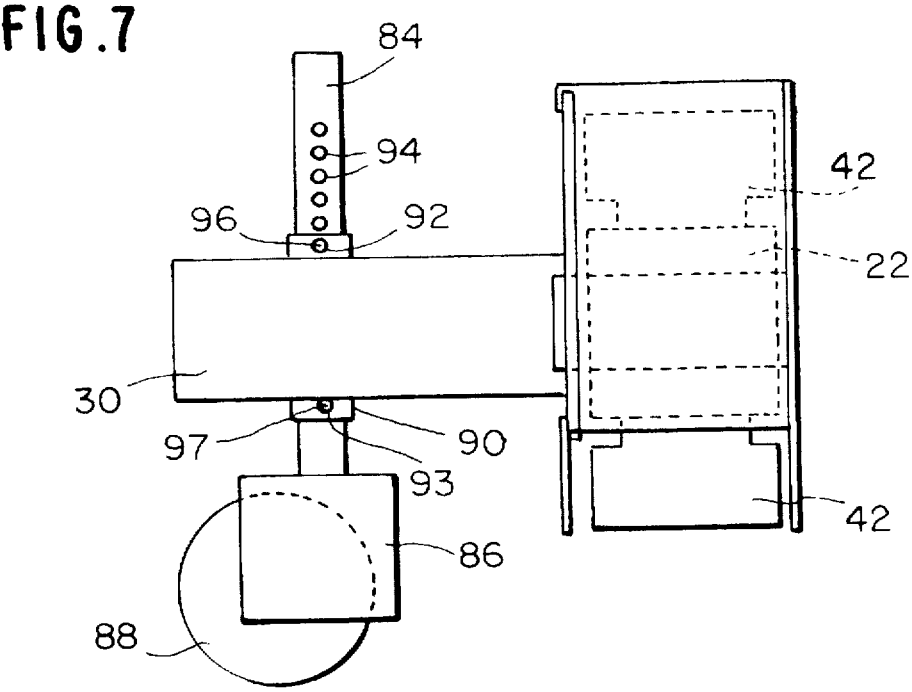
FIG. 7 is a side elevation view of the mower as viewed from the left side in FIG. 3 with the drive means removed.
FIG. 8 is a side elevation view of the mower as viewed from the right side in FIG. 3.

A support assembly 76 is also fixedly mounted on the rear surface of the support plate 14 in alignment with the pivot shaft 20. Support blocks 76, 78, 80 and 82 are mounted in the three bearing assemblies 30, 32 and 52 and the support assembly 76. Each of the support blocks is provided with a vertically extending aperture through which the shank 84 of a wheel assembly is slidably mounted. The shank 84 is connected to a U-shaped housing 86 and wheel 88 is rotatably supported within the U-shaped housing by means of a shaft (not shown). A bearing sleeve 90 is slidably mounted in each support block and surrounds each shank 84. As seen in FIG. 7, a pair of holes 92 and 93 extends through the sleeve above and below the support block and a plurality of holes 94 extend through the shank 84. Pins 96 and 97 extend through the holes 92 and 93 and the selected aligned holes 94 to restrain the sleeve in the support block and adjustably support the wheel at the desired height. Thus the wheel can swivel freely relative to the support block.

Figure 5:
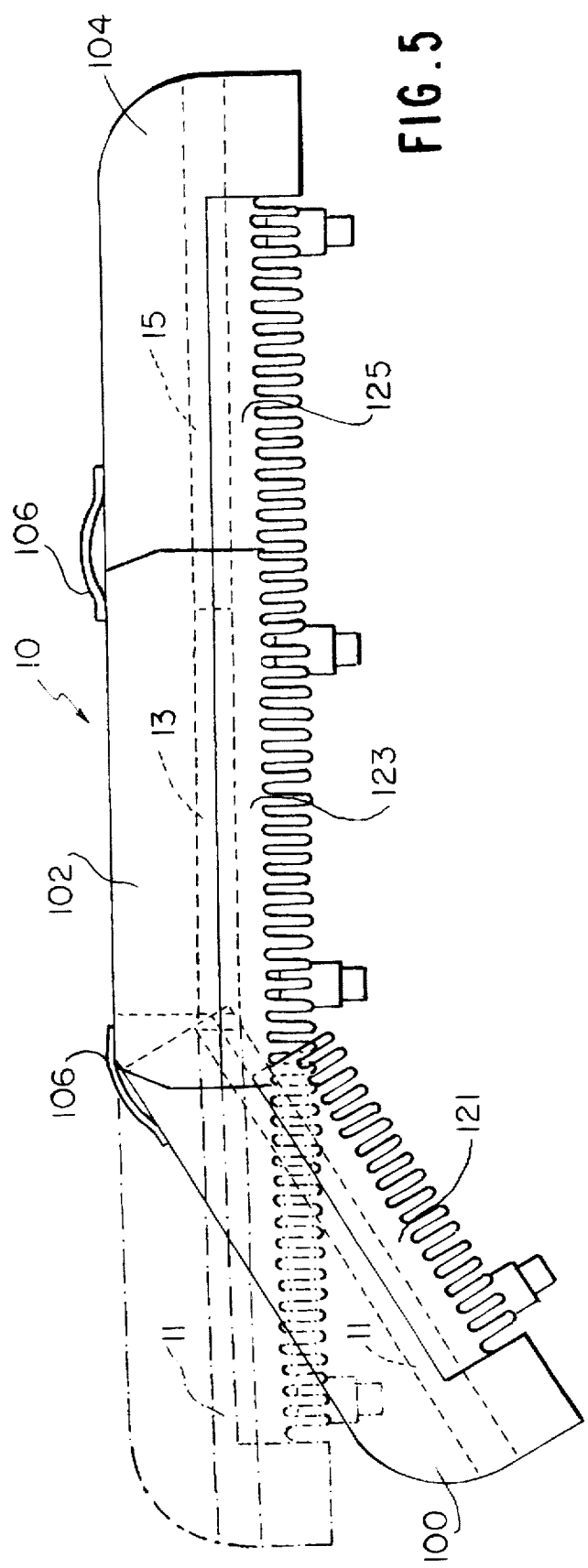
FIG. 5 is a front elevational view with the front and top guards in position.

The mower unit 10 as shown in FIG. 5, is provided with a top and front shroud comprised of three pieces 100, 102 and 104 which are detachably secured to the front support plates 11, 13 and 15, respectively by means of nuts and bolts (not shown). The combs 121, 123 and 125 are also detachably secured to the front support plates 11, 13 and 15, respectively. The two end units comprised of the support plates 12 and 16 and the components attached thereto may be pivoted relative to the center unit comprised of the support plate 14 and the components attached thereto at an angle up to approximately 30 degrees as shown in FIG. 5. A pair of lugs 101 and 103 are secured to the rear support plate 16 and engage the end surfaces 105 and 107 of the rear support plate 14 to limit the pivotal movement of the plate 16 relative to the plate 14 in opposite directions. Similar lugs 109 and 111 are mounted on the rear support plate 12 for engagement with the end surfaces 113 and 115 of the rear support plate 14 for the same purpose.

A pair of wide straps 106 having a width substantially equal to the width of the housing are secured to the housings in overlapping relationship to the joints between the center unit and the end units as viewed in FIG. 5. This will provide coverage for any opening which might occur due to the pivoting of one unit relative to the other.

In order to properly guide the belt 40 during the pivotal movement of one unit relative to the other, a pair of belt guides 108 and 110 are mounted on the center support plate 14 adjacent each pivot pin 18 and 20, respectively. Each belt guide is provided with pivot slots 112 and 114 for guiding one edge of the belt 40. A pair of opposed belt guides 116 and 118 are mounted on a plate 13 and are provided with grooves (not shown) identical to the grooves 112 and 114 provided in the brackets 108 and 110. Thus the opposite edges of the belt 40 will be guided in the slots in the brackets 108, 100, 116 and 118. Since the ends of the slots are disposed in substantial alignment with the center of the pivot pins 18 and 20, the reaches of the belt 40 between the brackets and the end pulleys will be maintained in parallel relationship to each other without contacting any other structural elements and the cutting blades will be maintained in proper spaced relation relative to the housing or shroud.

Figure 6:
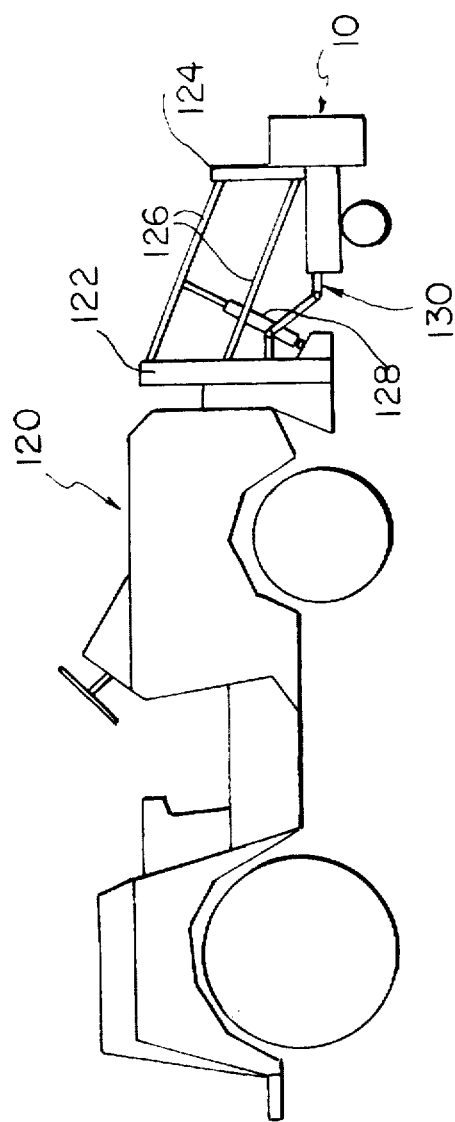
FIG. 6 is a schematic view showing the mower mounted on the front of a tractor.

By way of example, the mower 10 is shown in FIG. 6 as being mounted on the front end of a conventional lawn tractor 120. A first bracket 122 may be mounted on the front of the tractor 120 and a second bracket 124 may be mounted on the mower 10. The two brackets may be pivotally interconnected by a plurality of rods 126 to form a parallelogram and a conventional hydraulic cylinder 128 may be used to raise and lower the rods 126 and the mower attached thereto. A power take-off unit shown schematically at 130 may be provided for powering the mower from the engine of the lawn tractor. Although it is not shown, it is obvious that the mower 10 could also be mounted on the front end of a self-propelled power source. Typical drive means could be provided between the power source and the mower. As shown in FIG. 3, a belt drive 66 has been provided for connecting a source of power (not shown) to the drive pulleys 64 and 38 to drive the belt 40. However, any conventional direct drive could be substituted for the belt drive 66.

Figure 9:
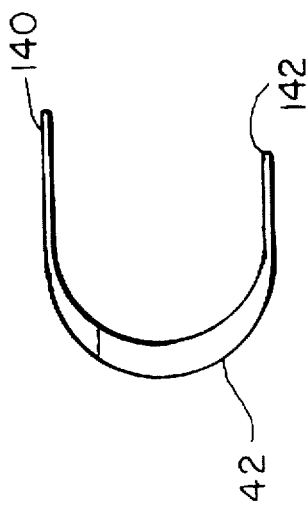
FIG. 9 is a side elevation view of a cutting blade, per se.
Figure 11:
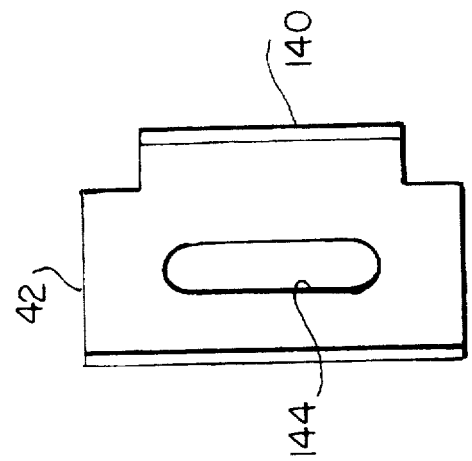
FIG. 11 is a right side elevational view of the cutter blade as viewed in FIG. 9.
Figure 10:
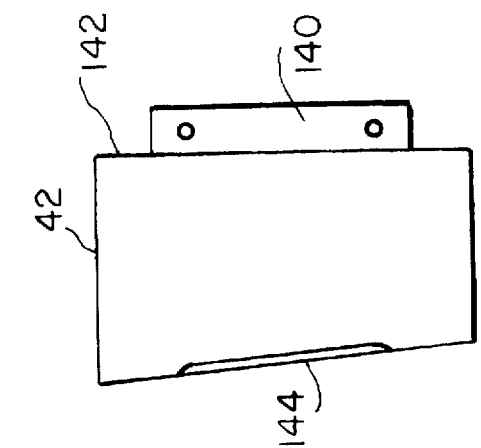
FIG. 10 is a bottom plan view of the blade shown in FIG. 9.
Figure 12:
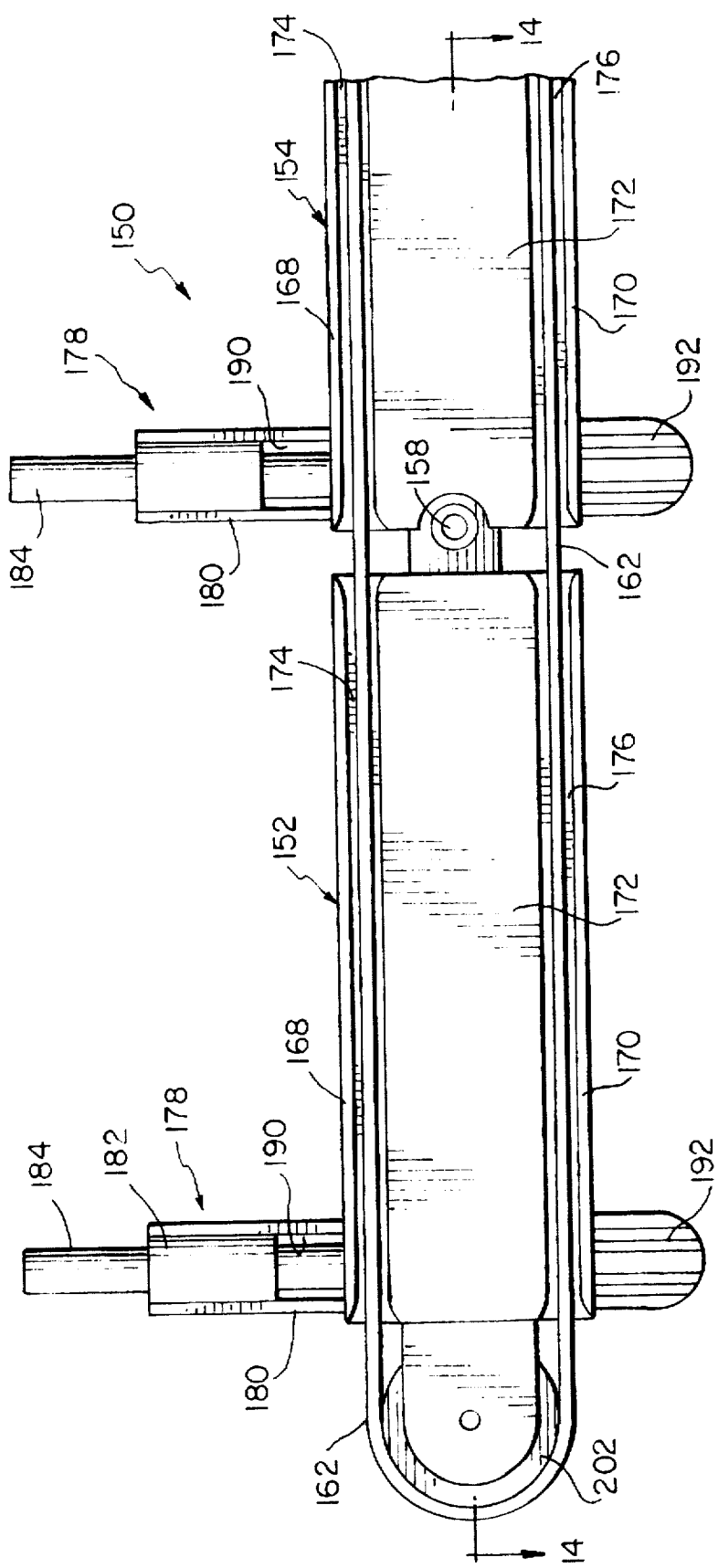
FIG. 12 is a front elevational view of the left half of the mower according to a second embodiment of the present invention with the front and top guard plates removed.
Figure 13:
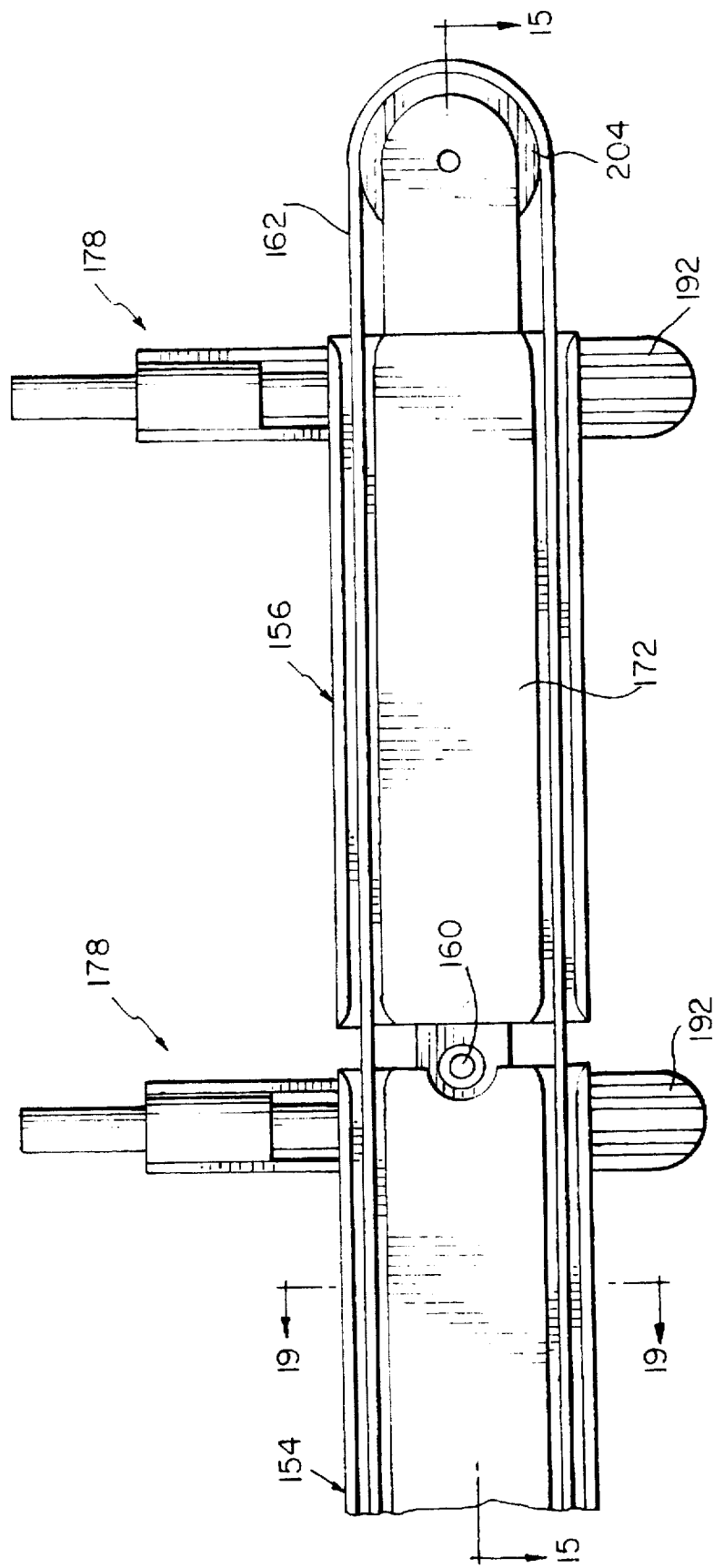
FIG. 13 is a continuation of the front elevational view shown in FIG. 12 showing the right half of the mower.

The construction of a blade 42 is shown in greater detail in FIGS. 9-11 inclusive. The blade is shown in side elevation in FIG. 9 and is provided with a bracket 140 for attachment to the belt by means of nuts and bolts. It is also feasible to use any other types of detachable fastener arrangement whereby the blades can readily be replaced on the belt 40. The blade 42 has a substantially C-shaped configuration as best seen in FIG. 9 with the cutting edge 142 being disposed at the opposite end of the blade from the bracket 140. The bight of the blade is angled relative to the cutting edge 142 and when mounted on the belt, will be angled to provide a rear discharge of grass clippings from the curved blade. The bight of the blade 42 is provided with a horizontal slot 144 which allows the passage of a limited amount of grass clippings for engagement and additional cutting by the next blade on the belt, thereby providing a mulching action. The blades are preferably made of steel but can be made of any other metal or plastic material depending upon the type of cutting being done.

The belt upon which the blades are mounted may be of reinforced rubber but also could be made of any other suitable material conventionally used in belt constructions.

The various components of the mower, including the support plates, brackets, pulleys and the like are all preferably made of a metal material, but plastic or any other type of material which provides sufficient strength for the purpose can be used.

In lieu of the curved blades as shown, the blades could be flat and secured on bosses which could be integrally molded with the belt or secured on the outer surface of the belt. The flat blades would extend parallel to the surface of the belt in the direction of travel.

Although the mower has been shown and described as being comprised of three articulated housings, the number could be larger or smaller.

The belt mower 150 according to a second embodiment of the invention, is shown in FIGS. 12–22 inclusive. The belt mower is comprised of three elongated housings 152, 154 and 156 which are pivotally interconnected for the purpose of accommodating uneven terrain. The housings 152 and 154 are pivotally interconnected at 158 and the housings 154 and 156 are pivotally interconnected at 160. Guard plates for protecting the belt have been eliminated with respect to the second embodiment but would be similar to the guard plates shown in FIG. 5 according to the first embodiment. While three separate housings have been shown in the second embodiment, it is possible to increase or decrease the number of housings depending upon the desired width of the cutting swath.

Each housing 152, 154 and 156 is comprised of a C-shaped channel member 164 comprised of a vertically disposed rear wall 166, a top flange 168 and a bottom flange 170. A hollow tubular spacer member 172 having a rectangular cross section is secured to the rear wall 166 in spaced relation to the top and bottom flanges 168 and 170 to define an upper channel 174 and a lower channel 176 through which the upper and lower reaches of the endless belt 162 are located in spaced relation to each other.

Each housing section 152, 154 and 156 is supported by one or more vertically adjustable wheel assemblies 178. The construction of each wheel assembly 178 is shown in detail in FIG. 22. Each wheel assembly 178 is comprised of a support bracket 180 having a plate 182 at a lower end which is welded to the rear wall 166 of the C-shaped channel member 164. The upper end of the bracket 180 supports a socket 183 as best seen in FIGS. 16 and 22a throughwhich a vertically disposed aperture through which post 184 extends. The post 184 has a plurality of transversely extending passages 186. A cotter pin 188 extends through an aperture in the support block 182 for engagement in a selected hole 186 to adjust the height of the post 184. A U-shaped bracket 190 is secured to the lower end of the post 184 and a wheel 192 is mounted for rotation about an axle 194 extending through the lower end of the U-shaped bracket 190. Thus the height of the housing member 156, as seen in FIG. 22, relative to the ground can be adjusted to vary the cutting height. The central housing section 154 is provided with two wheel assemblies 178 whereas each of the two outboard housing sections 152 and 156 are only provided with one wheel assembly 178 which are remote from the pivotal connections 158 and 160, respectively.

Figure 14:
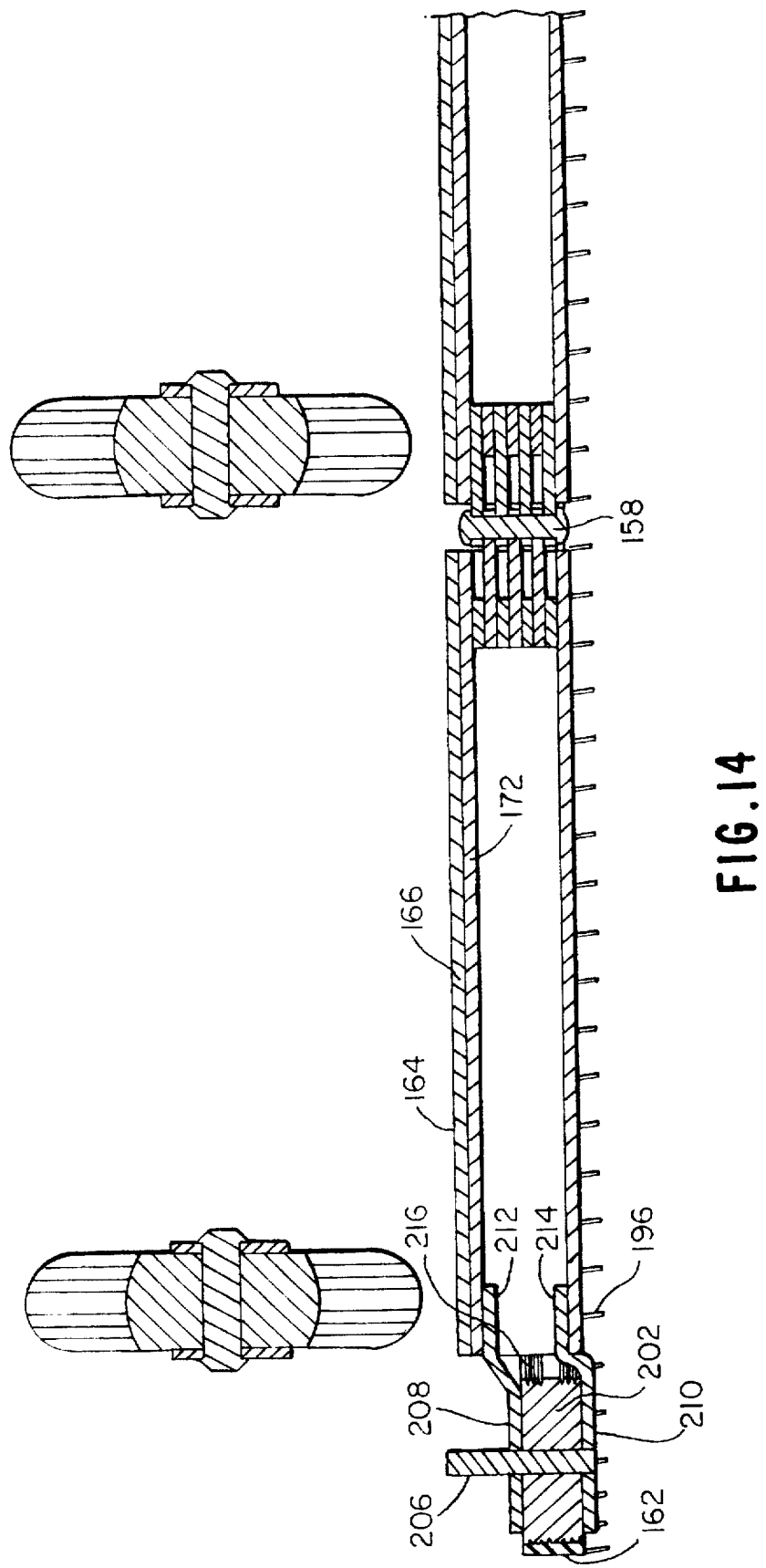
FIG. 14 is a sectional view taken along the line 14—14 in FIG. 12.
Figure 15:
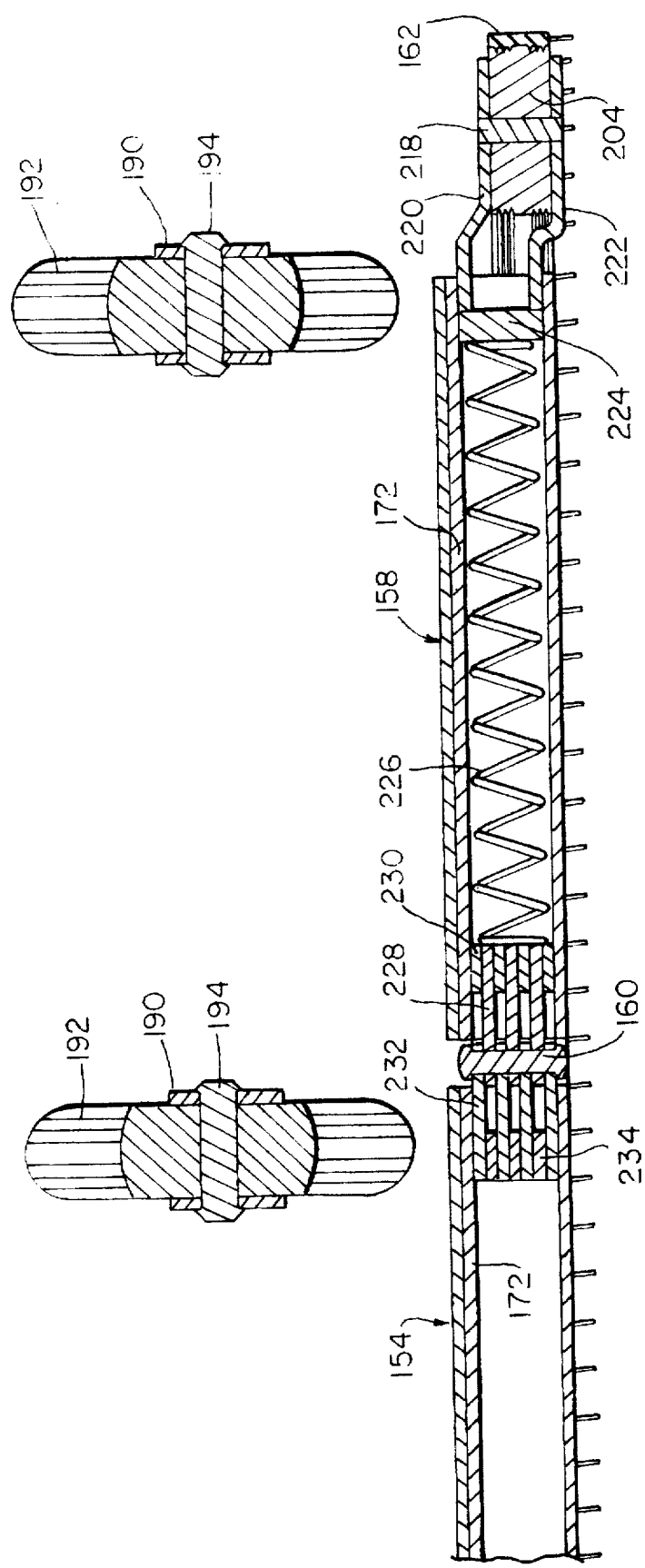
FIG. 15 is a sectional view taken along the line 15—15 in FIG. 13.

An endless belt 162 is entrained about pulleys 202 and 204 and is comprised of rubber material or a suitable composite material equivalent thereto. The cutting elements are comprised of a plurality of wires 196 which are inserted or imbedded by molding into the material of the belt and protrude outwardly from one edge of the belt. Although the wires may be individual straight wires which protrude at one end from the edge of the belt with the opposite end formed as a hook or having a high friction surface to prevent wire pullout as a result of the forces acting on the wire. However, the preferred form of cutting wire is a staple 198 as shown in FIG. 21 having two parallel ends 199 and 200 protruding from the edge of the belt. Thus the transverse portion of the U-shaped staple will provide the necessary resistance to retain the cutting elements or wires in the body of the belt 162. As best seen in FIG. 21, the wires of the staple are disposed at an oblique angle relative to the direction of the travel which is in the direction of the arrow A in FIG. 21. The purpose of the oblique angle is to allow material to slide off the wire and maintain a consistent relative cutting edge diameter. A build up of material on the wire could change the effective diameter and degrade the cutting ability of the wire. In the front elevational view of FIG. 1, the wires appear as short dashes due to the oblique angle of the wires. In FIG. 16, alternate wires appear angled in opposite directions but this is due to the fact that the wires protruding from the upper flight of the belt in the channel 174 are angled in the opposite direction to the wires protruding from the lower flight of the belt moving in the channel 176. The belt 162 is entrained about a pair of pulleys 202 and 204, as best seen in FIGS. 14 and 15. The pulley 202 is mounted for rotation on an axle 206 mounted for rotation in a pair of support plates 208 and 210 which are provided with offset end portions 212 and 214 which extend into and are welded in the hollow tubular member 172. As a result of the offset of the brackets, as shown in FIG. 14, the forward edge of the belt 162 from which the cutting elements protrude, will be substantially flush with the forward edge of the tubular member 172 and the forward ends of the flanges 168 and 170. In this way, only the cutting wires 196 will protrude from the channels 174 and 176. The belt 162 is provided on its inner surface with a plurality of V-shaped projections 216, extending the length of the belt, which cooperate with corresponding V-shaped grooves in the pulleys 202 and 204. The shaft 206 extends rearwardly beyond a support plate 208 for connection to a suitable drive means such as a motor or the like.

The pulley 204, as shown in FIG. 15, is mounted for rotation with a shaft 218 which is supported for rotation in a pair of supporting plates 220 and 22. The opposite ends of the plates 220 and 222 are offset and extend into the open end of the hollow tubular member 172. However, the plates 220 and 222 are not welded to the tubular member 172 but are welded or otherwise connected to a base plate 224 which is slidably mounted within the tubular member 172. A coil spring 226 is mounted within the hollow tubular member 172 with one end in engagement with the base plate 224 and the opposite end in engagement with a plurality of hinge plates 228 which are secured in the opposite end of the tubular member 172. Thus the spring will constantly bias the base member to the right as viewed in FIG. 15, thereby tensioning the belt 162 during operation.

The hinge constructions between adjacent housing sections are shown in FIGS. 14 and 15. Since the hinge constructions are identical, the hinge construction which incorporates the pivot pin 160, as shown in FIG. 15, will be described. As mentioned above, a plurality of hinge plates 228 are secured between a plurality of spacer members 230 with the entire assembly being secured within the open end of the tubular member 172. A similar set of hinge plates 232 are interleaved with a plurality of spacers 234 and the entire assembly is inserted into and secured within the hollow tubular member 172 of the center housing section 154. The ends of the hinge plates 228 and 230 protrude from the open ends of the tubular members 172 and the interleaved with each other. The hinge plates 228 and 232 are provided with aligned apertures through which the pivot pins 160 extend with the opposite ends thereof being peened over to secure the pivot pin within the assembly. The interleaved arrangement of hinge plates provides a very strong and reliable hinge construction.

As a result of the hinge constructions, the two end housing sections 152 and 156 may be pivoted relative to the central housing section 154. The extent of pivotal movement is shown by the phantom line illustrations of the housing section 152 in FIG. 17. Thus it is possible to travel along the top of an embankment with the housing sections 154 and 156 being substantially horizontally disposed and the housing section 152 angled downwardly to move along the sloping surface of the embankment. An enlarged detail view of the pivotal arrangement is shown in FIG. 18 which clearly shows the manner in which the housing 152 engages the housing 154 to limit the downward angular movement of the housing 152. A similar engagement between the housings would take place upon pivotal movement of the housing section 152 in the opposite direction. The pivotal action does not interfere with the operation of the endless belt 162 which will periodically come into sliding engagement with the tubular member 172 adjacent the pivotal connection between two housing sections. As best seen in FIG. 18, the corners of the tubular sections 172 and the flanges of the C-shaped sections have been rounded or bevelled to reduce the frictional wear on the belt 162.

In order to connect the articulated lawn mower assembly to a push-type frame or a tractor, a pair of U-shaped brackets 210 are mounted on the rear plate 166 of the center housing section 154. Connecting rods 212 are pivotally connected to the brackets 210 by means of pivot pins 214. The connecting rods 212 may be connected to a suitable motor source, such as a tractor shown in FIG. 6. As mentioned previously, the number of housing sections may vary depending upon the desired width of the cutting swath.

The housing members may be made of steel, aluminum or any other suitable material with the various components welded, brazed or otherwise connected together depending on the material chosen. The belt may be of plastic, rubber or other suitable material and the wire cutting elements may be of steel or plastic. The diameter of the wire can be 0.01 to 0.1 inch. The length of the wire must be sufficient to anchor the wires in the belt and still extend a sufficient distance beyond the side of the belt to provide effective cutting of grass.

The housing members 152, 154 and 156 can be provided with protective guard plates to protect the belt. Each housing, as defined by the C-shaped channel member 164 and hollow tubular member 172, fully protect the inside and outside surfaces of the belt and the rear side of the belt since the belt moves in upper and lower channels 174 and 176 which open outwardly in the forward direction of movement of the mower. A front guard plate similar to plate 121 would overlie the upper channel 174 with the comb-like teeth overlying the bottom channel 176. Suitable end guards similar to members 100 and 104 could also be provided to protect the belt as it passes over the end pulleys.

While the invention has been particularly shown and described with reference to preferred embodiments thereof, it will be understood by those in the art that the foregoing and other changes in form and details may be made therein without departing from the spirit and scope of the invention.

What is claimed is:

1. A mower comprising elongated forwardly open housing means, a pair of pulleys mounted in said housing means at opposite ends thereof for rotation about a pair of horizontally disposed axes respectively, an endless belt entrained about said pulleys, a plurality of cutting elements secured to said belt and drive means connected to at least one of said pulleys for driving said belt, wherein said housing means is comprised of a C-shaped channel member open in the forward direction of movement of the mower and a spacer member secured therein to define upper and lower channels in which upper and lower reaches of said endless belt are disposed.

2. A mower as set forth in claim 1, wherein each of said cutting elements is comprised of a plurality of wires secured to said belt and extending laterally from one side of the belt.

3. A mower as set forth in claim 2, wherein each wire protrudes from said belt at an oblique angle to a direction of travel of said belt.

4. A mower as set forth in claim 3, wherein each pair of adjacent wires is comprised of a staple having a connecting portion therebetween disposed on a side of said belt opposite the side from which the wires protrude.

5. A mower comprising elongated, forwardly open housing means, a pair of pulleys mounted in said housing means at opposite ends thereof for rotation about a pair of horizontally disposed axes, respectively, an endless belt entrained about said pulleys, a plurality of cutting elements secured to said belt and extending forwardly of said housing, drive means connected to at least one of said pulleys for driving said belt and adjustable rotatable means connected to said housing for supporting said housing means on the ground for movement along the ground in spaced relation thereto, wherein said housing means is comprised of a plurality of sections and horizontally disposed pivot means pivotally interconnecting said sections whereby said sections may pivot relative to each other in response to uneven ground.

6. A mower as set forth in claim 5, further comprising belt guide means in said housing means for engaging said belt to maintain opposed reaches of said belt parallel to each other upon pivoted movement of said sections of said housing means.

7. A mower as set forth in claim 6, wherein each section is comprised of a forwardly open C-shaped channel member and a spacer member secured therein to define upper and lower parallel channels in which said reaches of said belt are disposed.

8. A mower as set forth in claim 7, wherein said cutting elements are comprised of a plurality of wires secured to said belt and extending laterally from one side of the belt.

9. A mower as set forth in claim 8, wherein each wire protrudes from said belt at an oblique angle to a direction of travel of said belt.

10. A mower as set forth in claim 9, wherein each pair of adjacent wires is comprised of a staple having a connecting portion therebetween disposed on a side of said belt opposite the side from which the wires protrude.

* * * * *